March 13, 1934.   E. A. THOMPSON   1,950,639
TIMING CONTROL FOR SYNCHRONIZED POWER TRANSMISSIONS
Filed June 20, 1930   2 Sheets-Sheet 1

INVENTOR
Earl A. Thompson

March 13, 1934. E. A. THOMPSON 1,950,639
TIMING CONTROL FOR SYNCHRONIZED POWER TRANSMISSIONS
Filed June 20, 1930 2 Sheets-Sheet 2

Earl A. Thompson INVENTOR

Patented Mar. 13, 1934

1,950,639

UNITED STATES PATENT OFFICE 1,950,639

TIMING CONTROL FOR SYNCHRONIZED POWER TRANSMISSIONS

Earl A. Thompson, Birmingham, Mich., assignor to General Motors Corporation, Detroit, Mich., a corporation of Delaware Application June 20, 1930, Serial No. 462,512

5 Claims. (Cl. 192—53)

My invention relates to improvements in variable speed geared transmissions including toothed elements respectively adapted to be intermeshed to secure a positive driving connection, and friction synchronizing elements adapted to be brought into mutual engagement prior to meshing the toothed elements, and then released from engagement,—thereby effecting first a frictional coupling for the purpose of synchronizing the speeds of the two power transmission members to be positively coupled whereupon, after release of the frictional coupling, the toothed elements may be readily intermeshed. In the type of apparatus shown there is an operating connection between the toothed element, movable into intermeshing engagement with its companion, and the frictional synchronizing element movable into frictional engagement with its companion such that movement of one imparts movement to the other. The connection of the friction element, however, is detachable in response to application of a force in excess of that calculated as necessary to effect synchronization during the operation of changing speed ratio. This invention has particular reference to the said detachable connection, which is, in effect a control means for timing the shift of the transmission so as to allow time for synchronization and also to accurately vary the amount of pressure applied to operate the synchronizing means, according, first, to the rapidity of the shift made by the operator, and, second, according to the viscosity of the lubricant in the transmission as it varies with changes of temperature. In the illustrated embodiment the mechanism involves the use of a dash pot, fluid brake or retarding device which operates through the medium of the transmission lubricant and has novel means for varying and relieving the pressures developed in the dash pot, and also means for equally recharging the dash pot with the operating fluid, that is, the lubricant oil, so that repeated operations may be made without undue loss of time required for refilling the dash pot. This mechanism is suitable for use in a transmission such as that shown and described in my Patent #1,854,281 and my copending application Serial No. 186,454, filed April 25, 1927.

Other objects and advantages will appear in the further description of my invention, which I have illustrated in the accompanying drawings and will now describe:

Figure 1:
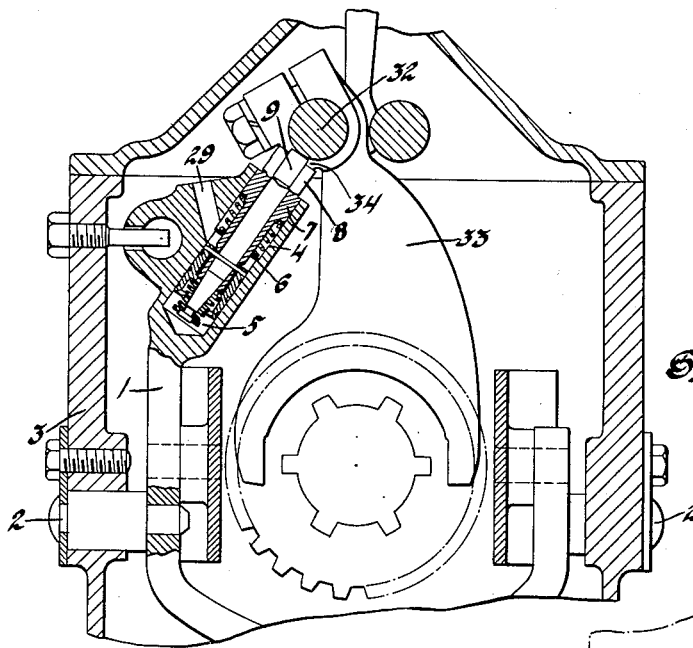
Figure 1 is a transverse vertical section through a synchronized transmission with parts shown in elevation.
Figures 2, 3, 4:
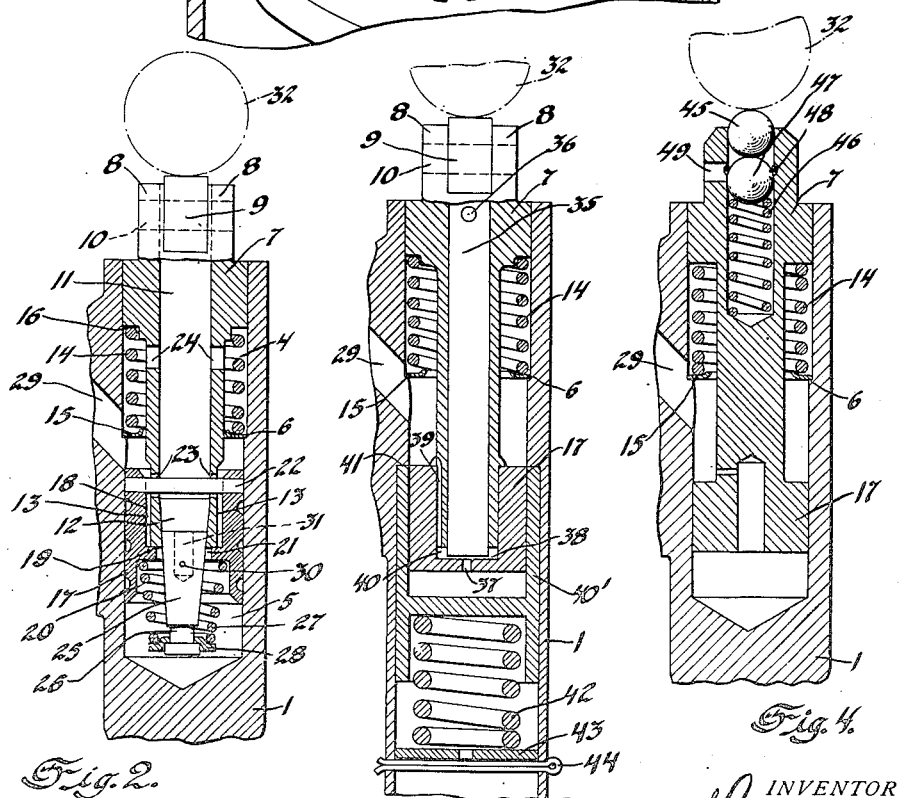
Figure 2 is an enlarged vertical section through the top of the synchronizing lever or yoke with parts of the timing control means shown in elevation.
Figure 3 is an enlarged sectional view of a modified form of timing control means, with parts shown in elevation.
Figure 4 shows another modification of timing control means with parts in section similar to Figures 2 and 3.
Figure 5:
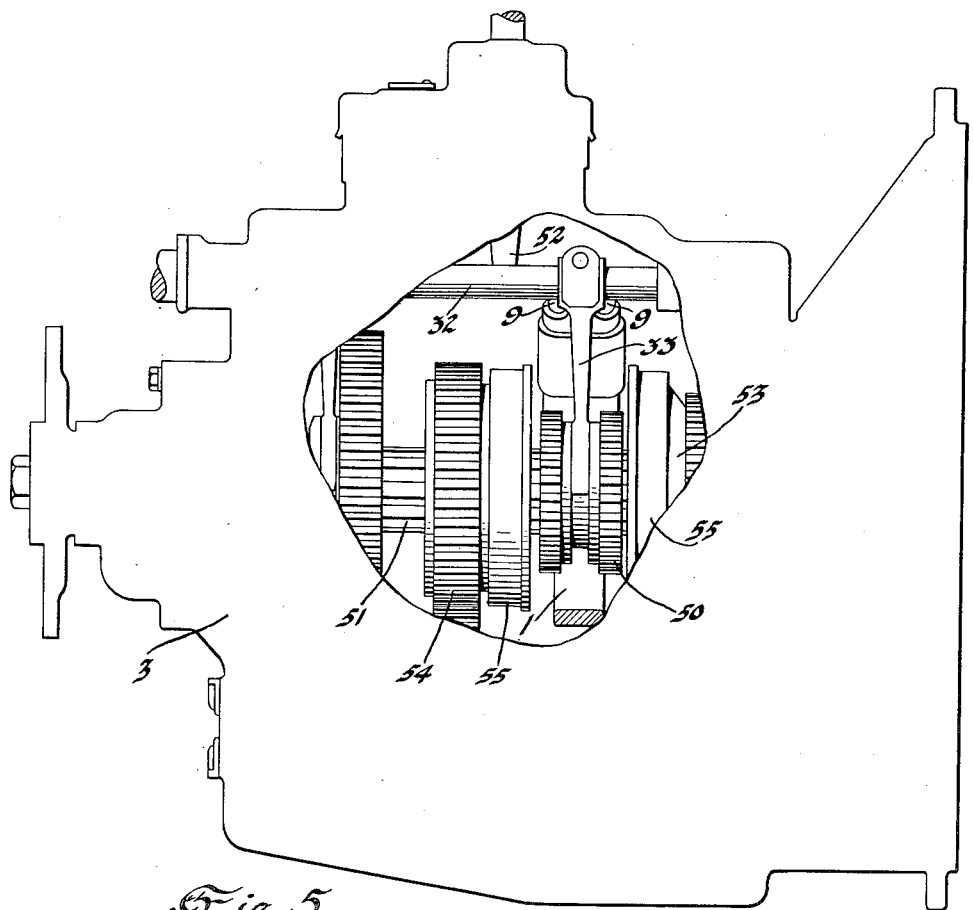
Figure 5 is an outline view of an automobile transmission with part of the casing broken away to show the synchronizing elements and operating yoke therefor in position in the transmission.

In Figure 5 there are shown two power transmitting members 53 and 54, either of which may be positively coupled to a power transmitting member or shaft 51, at the will of the operator thru operating means comprising a manual control device, shift rod, shifter fork connected to a positive coupling element and a yoke lever connected to the friction clutch element of the synchronizer and releasably locked to the shift rod. A double ended toothed coupling element 50 is slidably splined on shaft 51. Coupling element 50 is engaged by shifter fork 33 which is rigidly connected to a shift rod 32 so that when the shift rod is moved, by a control device such as a hand lever 52, to the right, as viewed in the illustration, the coupling element 50 may be interlocked with the member 53 which is rigid with the main clutch shaft and when moved to the left said coupling element may be interlocked with the member 54, which is the intermediate gear of an automobile transmission that at other times may rotate freely on the shaft 51. Friction drums 55, slidably splined to shaft 51, are adapted, respectively, to be pressed into frictional engagement with companion surfaces on shaft member 53 or on gear 54, prior to intermeshing the toothed coupling element 50 with one or the other of its companions, and to be released before the toothed coupling element interlocks with its companion. Movement is imparted to the friction drums through the yoke or lever 1 by the movement of shift rod 32 which moves endwise in unison with coupling element 50. Yoke 1 has one end detachably connected to shift rod 32 by a timing connection including plunger or lock bolt 7 which must be depressed before said yoke can be released from the shift rod, but can be depressed only by a force in excess of that needed to press the friction surfaces together strongly enough to bring the parts to be positively coupled to substantially equal speed in the time consumed in making the ratio change. As thus far described the construction is disclosed in my prior application referred to. Description of this improvement follows:

The upper end or head of the yoke 1 has an upper cylindrical chamber 4 and a lower cylindrical chamber 5 slightly smaller in diameter than the upper chamber 4, which forms a shoulder as at 6. These chambers form a cylinder in which the plunger mechanism operates, and I will now describe in detail the construction of the plunger mechanism as shown in Figs. 1 and 2.

Mounted in the cylinder is a plunger 7 having an enlarged outer part slidably fitted in the chamber 4. The exterior end of this plunger has ears formed on it as at 8, which carry a roller 9 mounted on a pin 10. The plunger 7 has a hole 11 drilled through its entire length, the lower end of which is tapered as at 12 to form a valve seat as will later be described. The lower end of the plunger 7 has flats milled on its sides as at 13, the purpose of which will be later understood. A spring 14 rests on a washer 15, carried on the shoulder 6 in the cylinder bore of the yoke, and bears against the underside of the enlarged outer portion of the plunger as at 16. In the lower part of the yoke chamber cylinder 5 is mounted a piston 17, which has a cylindrical recess 18 formed in its uppermost part, this recess receiving the lower end of the plunger 7 so that the lower end thereof seats against the shouldered bottom of the recess 18 as at 19. The lower part of the piston 17 is counterbored as at 20, and an opening 21 connects the counterbore 20 with the recess 18, the diameter of the opening 21 being smaller than the diameter of the recess 18 and counterbore 20, the reason for which will be later understood. A pin 22 passes through holes drilled through the upper part of the piston 17 and also passes through holes 23 drilled through the lower part of the plunger 7, the holes in one of the members 7 or 17 being somewhat larger in diameter than the pin 22 so as to allow a lost motion or limited reciprocal movement of the plunger 7 relative to the piston 17. The plunger 7 has holes 24 drilled through and intersecting the hole 11 for the purpose of allowing free circulation of oil through these parts and preventing trapping of air bubbles.

Fitting into the tapered hole 12 of the plunger 7 is a valve 25 having a taper corresponding to the taper of the hole, the lower end of the valve 25 having a groove 26. A spring 27 is interposed in the counterbore 20 between the shoulder 19 within piston 17 and a small U washer 28 fitted in the groove 26 formed in the valve 25. This spring 27 holds the valve 25 down against its seat 12 in the plunger and also presses the piston 17 upwardly so that the end of the plunger 7 is in contact with the shoulder 19 formed in the piston. The valve 25 is provided with a small relief hole as at 30, which is drilled through the side of the valve and intersects another hole drilled in from the upper end of the valve as at 31.

An opening 29 is provided in the upper portion or head of the yoke which connects with the chambers 4 and 5 for the purpose of supplying transmission lubricant to said chambers. The circulation of the oil by the gears in the transmission casing is relied upon to splash sufficient lubricant into the upper part of the casing so that chambers 4 and 5 will be amply supplied with oil at all times.

It will be understood, by reference to Figure 1, that the roller 9 constituting a part of the pressure receiving head of the plunger mechanism just described is pressed upwardly against the shift rod 32 by means of the coil spring 14. The shifter fork 33, which is mounted on the shift rod 32, has a beveled cam-like abutment at 34 formed on the hub of the shifter fork 33. The purpose of this abutment is to rock the yoke about its axis 2—2 for engaging the synchronizing mechanism, and then when this is done to depress the plunger to relieve pressure on drum 55 and permit shifting of coupling element 50.

As before stated the primary object of my improved plunger mechanism is to rock the yoke with sufficient pressure that ample synchronizing effect will be had under all conditions of operation and also to time the synchronizing interval according to the demands of varying conditions. For example, more synchronizing effect will be required if the operator desires to make a quick shift than if he desires to make a deliberate shift, and more synchronizing effect will be required when the transmission lubricant is cold and its viscosity consequently higher than when it is heated to normal working temperatures. My invention is designed to compensate for these varying conditions and produce the correct amount of synchronization for the complete range of operating temperatures as well as for rapid or deliberate shifting. It will accomplish these results with extreme ease of operation.

The relief hole 30 in the valve 25 is proportioned of such a size that it will produce the correct amount of pressure in the chamber 5 when the plunger mechanism is depressed by a normal shift with the transmission lubricant at its maximum temperature. The coil spring 27 has an initial tension which will just be overcome by the pressure of the transmission oil in the chamber 5 acting against the projected area of the valve 25 when the pressure exceeds that produced by a normal shift, with the transmission lubricant at maximum temperature. It will therefore be seen that as the temperature of the oil decreases for a given rate of movement of the shift that a greater pressure will be developed in chamber 5, and depending both upon the viscosity and the rate of movement, this pressure will increase to overcome the spring 27 and raise the valve 25 so as to give additional relief for escape of transmission oil between the valve and its tapered seat 12. The rate of build up of the spring 27 is proportioned to govern this relieving action so that the highest viscosity produced by the lowest temperature will result in a sufficient pressure being developed in chamber 5 to resist the downward movement of the plunger to give the proper synchronizing pressure for this low temperature condition, and will graduate the pressure required for all intermediate conditions. It will further be readily understood that if a quick shift is desired that a higher pressure will be developed in chamber 5 for a given viscosity of oil than when a slow or deliberate shift is made, the difference in the duration of the synchronizing interval being compensated for by this increase of pressure and consequent synchronizing effect.

The operation of the above described plunger mechanism is as follows:

Assuming that the chambers 4 and 5 are completely filled with the transmission oil and that it is desired to make a shift, movement of shift rod 32 against the roller on the end of the plunger 7 will first rock the yoke on its pivots to engage the synchronizing device and further movement of the shift rod will cause the beveled abutment 34 to depress plunger 7 against the action of the spring 14. At the same time in order to allow the plunger to descend the oil which is in the chamber 5 must escape from beneath the piston 17. As above set forth the escape of this oil will be through the small hole 30 for a normal shift with the oil at maximum temperature. In addition to this, relief will be had though the opening between the taper valve 25 and its seat 12 for lower temperatures and further relief if the shift is made at a rate above the normal deliberate movement.

When the shift into neutral is made the operation for refilling the chamber 5 is as follows: The piston 17 and lower end of the plunger 7 are designed to form a check valve the seat of which is at 19. This seat is normally kept closed by the initial tension of the spring 27, but when the plunger 7 is forced up to its normal position by the action of the coil spring 14 an opening will be had at the seat 19 equal to the difference in radius of the pins 22 and the holes 23 through the plunger 7. This opening will remain until the chamber 5 is filled with oil for the reason that the initial tension of the spring 27 is insufficient to force the piston 17 upwardly against atmospheric pressure on its projected area. Transmission oil is fed down to the seat 19 by means of the openings formed by the flats 13 on the lower end of the plunger 7.

The modification shown in Figure 3 utilizes a means for obtaining thermostatic control of the pressure developed in the chamber beneath the piston 17. A thermostat bar 35, made of suitable material having a high co-efficient of expansion such as hard rubber or ebonite, is mounted in the plunger 7 by means of a pin 36 which passes through the bar 35 and the plunger 7. The lower end of the thermostat bar 35 is spaced from a small opening or hole 37 in the bottom of the piston 17 so that with varying temperatures the width of the space, as at 38, between the end of the thermostat bar and the piston, will vary with varying temperatures, that is, the lower the temperature the greater the space and the higher the temperature the smaller the space, thus controlling the area of relief for the oil to pass through in proportion to the temperature thereof. The lower end of the plunger 7 has a groove 39 formed in the side thereof to communicate with the space 40 around the lower end of the thermostat bar 35. The piston 17 is secured to the plunger 7 in any suitable manner so that the two operate together as a unit. One satisfactory way of making this assembly is to make the lower end of the plunger 7 a pressed fit into the piston 17.

Another feature illustrated in this modification is the yieldable cylinder 40' in which the piston 17 operates. This cylinder is pressed upwardly against the shoulder 41 formed in the cylinder bore of the yoke by the heavy coil spring 42, the lower end of the spring resting upon a washer 43 which is held in place by a cotter pin 44. The purpose of this spring 42 is to allow the whole assembly to be depressed the full stroke of the plunger, or any part thereof, whenever the pressure in the chamber below the piston 17 exceeds a pre-determined amount. By varying the building up of the spring 42 almost any action desired can be obtained. It will thus be seen that with this construction, even if the transmission oil below the piston 17 should become solidified, that a shift can be made by overcoming the strong spring 42.

The modification illustrated in Figure 4 shows a plunger similar to that shown and described in my co-pending application hereinbefore referred to, except that the ball 45 is held in its uppermost position by strong spring 46, which presses against a ball 47. The ball 47 is limited in its upward movement by a snap ring 48 which is snapped into an annular groove inside of the hole in the plunger 7, as shown. A small hole 49 is drilled through the side of the upper part of the plunger 7 to facilitate removal of the snap ring 48, should it be necessary. The object of this arrangement is to allow the ball 45 to depress through the compression of the strong spring 46, in the event of any condition arising which prevents the plunger proper from descending, for example, such as the solidification of the oil beneath the piston portion 17 during extreme cold conditions. It will be readily understood that the ball 45 performs the same function in this arrangement as the roller 9 does in the arrangement shown in Figures 2 and 3.

While I have illustrated and described my invention as it now appears to me I am aware that changes may be made in the various arrangements of parts and details by those skilled in the art without departing from the spirit of the invention, so I do not therefore limit my invention to the arrangements shown and described except as I may be limited by the hereto appended claims.

I claim:

1. In mechanism of the class described, a friction clutch operating member having a cylinder bore open at one end and a liquid inlet in communication with the bore; a plunger bolt guided in the cylinder bore and having a pressure receiving head protruding from the cylinder bore; a shift member provided with a cam-like element movable transversely of the plunger axis and arranged to engage the pressure receiving head of the plunger; a spring for urging the plunger head into the path of movement of the cam-like element on the shift member; a piston having therethrough a passage adapted to be closed by the inner end of the plunger; means forming a constantly open relief passage for liquid from one side to the other of the piston, and lost motion connecting means between the plunger and the piston.

2. In mechanism of the class described, a fluid resistant device comprising a chambered body, a piston, movable in the chamber, having a controllable passage through it; means forming a constantly open relief passage from one side of the piston to the other; a piston operating member movement of which in one direction is resisted by the pressure of fluid within the chamber exerted on the piston but in the reverse direction relatively unresisted, said piston operating member having a surface disposed in relation to the piston so as to close the controllable passage through the piston upon operation in one sense of direction and open it upon operation in the reverse sense.

3. In mechanism of the class described, a member having a cylinder bore open at its outer end; a plunger, having a pressure receiving head, guided in the cylinder bore; a spring arranged to urge the plunger outward; a piston having a lost motion connection to the plunger, said piston having therethrough a passage adapted to be closed by the inner end of the plunger during the inward movement and opened during the outward movement of the plunger; means forming a constantly open relief passage past the piston; a spring tending to hold the piston in contact with the inner end of the plunger, and means for admitting liquid at all times to the cylinder bore on the plunger side of the piston.

4. In mechanism of the class described, a member having a cylinder bore open at its outer end and a lateral inlet for liquid to the bore; a plunger, having a pressure receiving head, guided in the cylinder bore; a spring arranged to urge the plunger outward; a piston having a passage in communication with a recess receiving the inner end of the plunger; an annular shoulder at the junction of the passage and the recess adapted to cooperate with the plunger to control the passage, there being space between the sides of the plunger and recess to admit liquid, and means to form a constantly open relief passage for liquid from one side to the other of the piston.

5. In mechanism of the class described, a member provided with a cylinder bore open at one end; a tubular plunger having a valve seat at its inner end and lateral holes outward of the valve seat; a spring arranged to urge the plunger outward; a piston having longitudinal lost motion connection with the plunger, and a passage therethrough adapted to be closed by the lower end of the plunger; a valve associated with the valve seat in the plunger; a spring disposed between the piston and valve tending to keep the valve on its seat; means forming a constantly open relief passage for fluid from one side to the other of the piston, and means for supplying liquid to the cylinder.

EARL A. THOMPSON.